United States Patent [19]

Sasuga

[11] 4,190,358
[45] Feb. 26, 1980

[54] APPARATUS FOR POSITIONING AN ORIGINAL IN REPRODUCING MACHINES

[75] Inventor: Kazuyasu Sasuga, Ebina, Japan

[73] Assignee: Rank Xerox Limited, London, England

[21] Appl. No.: 870,164

[22] Filed: Jan. 17, 1978

[30] Foreign Application Priority Data

Feb. 25, 1977 [JP] Japan .................................. 52-19141

[51] Int. Cl.² ............................................ G03B 27/62
[52] U.S. Cl. ..................................................... 355/75
[58] Field of Search .................. 355/74, 75, 25, 91–94

[56] References Cited

U.S. PATENT DOCUMENTS

| | | | |
|---|---|---|---|
| 2,412,507 | 12/1946 | Hunter | 355/74 |
| 2,869,447 | 1/1959 | Young Berg | 355/94 |
| 3,089,384 | 5/1963 | Baasner | 355/74 |
| 3,558,223 | 1/1971 | Hemphill | 355/75 X |
| 3,609,032 | 9/1971 | Watanabe et al. | 355/25 |
| 3,630,611 | 12/1971 | Hoyer et al. | 355/75 |
| 3,994,582 | 11/1976 | Goshima et al. | 355/75 |

Primary Examiner—Donald A. Griffin

[57] ABSTRACT

An apparatus for positioning an original in a reproducing machine characterized in that an original positioning member (registration edge) provided to one side of an original mounting table (i.e. transparent platen) is adapted for moving adjustment in the direction of scanning of an original. The adjustability of the registration edge provides a simple means for obtaining synchronization between copy paper feed and the scanning of the original.

2 Claims, 4 Drawing Figures

APPARATUS FOR POSITIONING AN ORIGINAL IN REPRODUCING MACHINES

BACKGROUND OF THE INVENTION

This invention concerns as apparatus for positioning an original in a reproducing machine to insure synchronization between the copy paper feed and the scanning of the original.

In reproducing a copy from an original in a conventional reproducing machine, the original has been placed on an original mounting table made of transparent glass referred to as a platen. But copied images are some times not reproduced at predetermined positions but shifted therefrom on the copying paper. This is attributable to the discrepancy in timing or synchronization between the original scanning or transfer operation and the feeding of the copying paper.

Such a discrepancy in the timing, if produced, should be adjusted by proper means to a predetermined exact timing, which heretofore has been practiced by a so-called registration mechanism for adjusting the feeding time of copying paper.

The adjustment for the timing of feeding the copying paper that is, the adjustment of the so-called registration mechanism is, however, not totally desirable in that the adjustment itself requires a delicate operation or the adjustment is complicated, being related to the timing of other mechanisms, thus laborious and inefficient.

PRIOR ART STATEMENT

While it is known in the prior art to provide a multiposition registration edge in a reproducing apparatus, for example, as disclosed in U.S. Pat. No. 3,630,611, it is not known to provide such a registration edge for lack of synchronization between an optical scanning system and the copy paper feed. As disclosed in the foregoing patent, the two position registration device accommodates registration of different size document material along the optical centerline. However, because of the specific way in which the patentee's device was designed, it is not suitable for the purpose intended herein.

Multiple positioning of the effective registration edge in a reproducing apparatus is taught in U.S. Pat. application Ser. No. 698,644, filed June 22, 1976 and assigned to Rank Xerox. The foregoing application discloses the repositioning of the platen by movement in the direction of scanning to shorten the exposed or scanned area of the platen and to move the edge of a book page on the platen to the copier registration position for copying of the book page onto a smaller copy sheet corresponding in size to the book page rather than the platen size. Such an arrangement is not, however, believed to be anticipatory of the device specifically disclosed and claimed hereinbelow.

SUMMARY OF THE INVENTION

This invention has been made in order to overcome the foregoing defects and it is the object of this invention to provide an apparatus for positioning an original in a reproducing machine capable of setting the position of an original with an extreme case, eliminating the need of a complicated timing adjustment, and optionally changing the position of the original in a copying paper.

BRIEF DESCRIPTION OF THE DRAWINGS

This invention is to be described by way of a preferred embodiment referring to the drawings.

The drawings show a preferred embodiment of this invention wherein.

DETAILED DESCRIPTION OF THE PREFERRED EMBODIMENT

Figure 1:
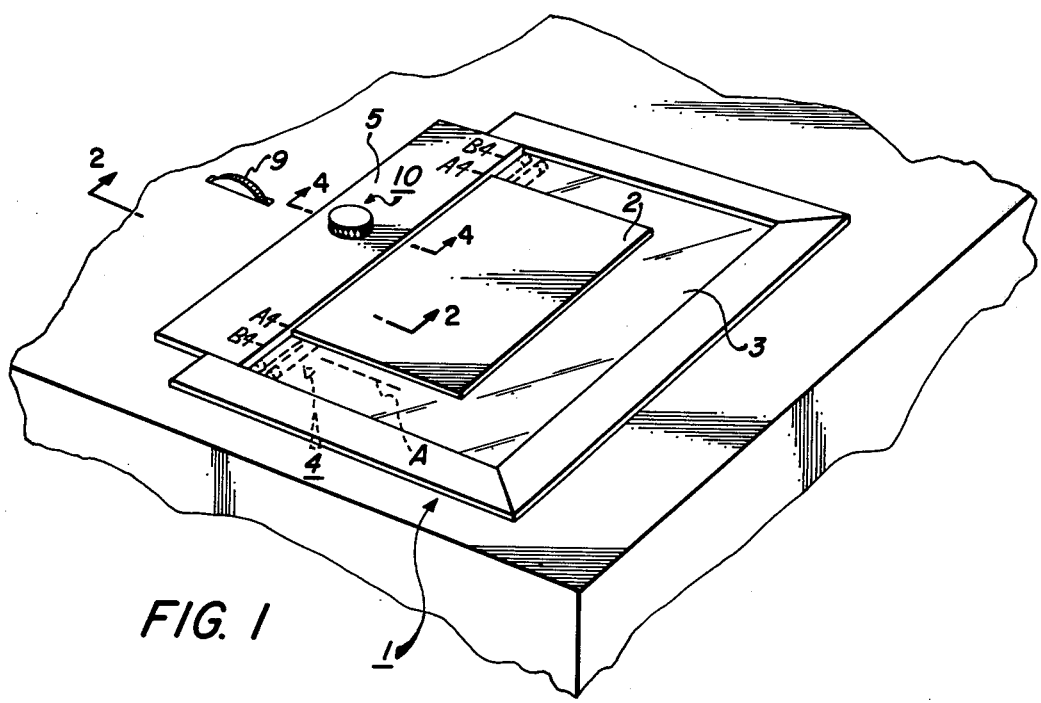
FIG. 1 is a partially cut away perspective view.

Reference numeral 1 denotes a reproducing machine main body on which a platen 3 for supporting an original 2 is provided. An optical system 4 including a lamp and mirror assembly is adapted to move under the platen 3 in the direction of an arrow A (FIG. 1) and in a conventional manner cooperative with another moving mirror (not shown) to flow a light image onto a photosensitive member (also not shown).

Figure 2:
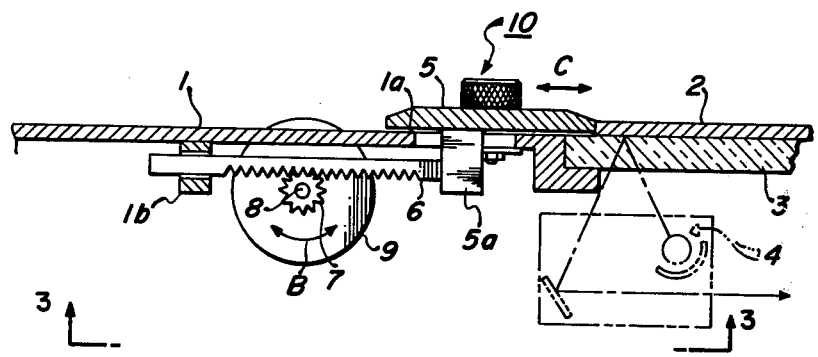
FIG. 2 is a cross sectional view taken along lines II—II in FIG. 1.
Figure 3:
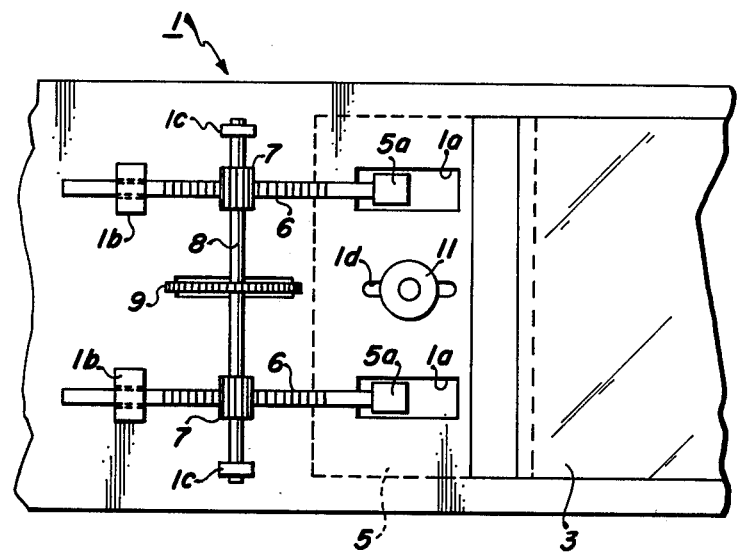
FIG. 3 is a rear elevational view taken along lines III—III in FIG. 2.
Figure 4:
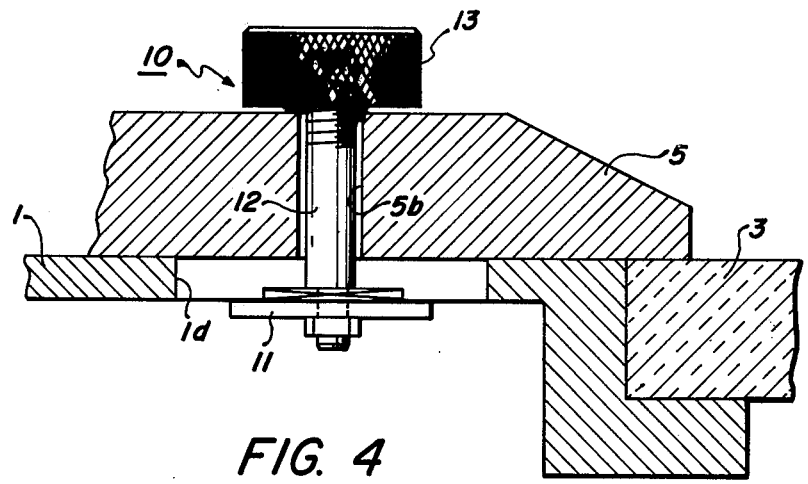
FIG. 4 is a cross sectional view taken along lines IV—IV in FIG. 1.

To one side of the above platen 3, is provided an original positioning member (registration guide or edge) 5 adapted to be capable of moving adjustment along the moving direction of the above optical system 4. More specifically, the original positioning member 5 is provided, on both sides of the bottom surface thereof, with a pair of legs 5a, 5a (FIGS. 2 and 3) which project downwardly through elongated apertures 1a, 1a perforated in the upper cover of the machine main body 1. The above legs 5a, 5a are attached to rack members 6, 6 extending along the upper wall of the machine main body 1, and a rotational wheel 9 is mounted to a shaft 8 having fixed thereon pinion gears 7, 7 meshing with the above rack members 6, 6 so that the circumferential surface of the rotational wheel 9 is partially exposed through the upper wall of the machine main body 1. The rotational wheel 9 is adapted so that the exposed portion thereof, when rotated by a finger in the direction of an arrow B (FIG. 2), effects adjustment or movement of the original positioning member 5 in the direction of an arrow C (FIG. 2) by way of the shaft 8, the pinion gears 7, 7, the rack members 6, 6 and the legs 5a, 5a.

Numerals 1b, 1b represent supports for the rack members 6, 6 and numerals 1c, 1c represent supports for the shaft 8.

The original positioning member 5 has mounted at the middle thereof, a setting member 10, whereby the original positioning member 5 can be set to an adjusted position after the moving adjustment. Specifically, the setting member 10 comprises a threaded rod 12 having mounted, at its lower end, a cam plate 11 and extending through the upper wall of the machine main body 1 passing through an elongated aperture 1d perforated in the upper wall and an aperture 5b perforated in the original positioning member 5. A rotational knob 13 is in a threading engagement with the exposed end of the threaded rod 12. With the above adaptation, the original positioning member 5 can be clamped at a predetermined position by rotating the rotational knob 13 to thereby decrease the distance between the rotational knob 13 and the cam plate 11 at the lower end of the threaded rod 12, while on the other hand the original positioning member 5 is allowed to move by increasing the distance between the rotational knob 13 and the cam plate 11 whereby the threaded rod 12 can freely move along the elongated aperture 1d perforated in the upper-wall of the machine main body 1 with no hindrance at all to the movement.

A scale (not shown) may be provided near both or either of the sides of the above original positioning member 5, by which a binding space for a copying paper can be set optionally and securely.

In using the apparatus for positioning an original in a reproducing machine having the foregoing construction, reproduction is effected by placing the original 2 on the platen 3 while abutting it against the terminal edge of the original positioning member 5 set to a predetermined position. Where the copied image on the copying paper is shifted to the right, the original positioning member 5 is adjusted to the home position side of the lamp assembly in the optical system 4, that is, to the left as viewed in FIG. 2. That is, the timing at which the images of the original begin to focus on a photosensitive body (not shown) can be adjusted by the moving adjustment of the original positioning member 5 along the moving direction of the optical system 4.

Although in the above embodiment, the original 2 is stationary while the optical system 4 is adapted to move, it will be obvious that this invention is also applicable to another embodiment where the optical system is stationary while the original is adapted to move.

As set forth in the foregoing description, since the original positioning apparatus in a reproducing machine according to this invention is adapted so that an original positioning member provided on one side of an original mounting table is adapted to be capable of moving adjustment in the direction of scanning the original, it is very efficient in that the position of the original can be set very easily by merely abutting the terminal edge of the original to that of the original positioning member which has been subjected to the moving adjustment and the complicated adjustment for the timing can be saved, as well as the positions of the copied images resulting on the copying sheet paper can optionally be changed and the setting of a binding space to the copy to be obtained can be effected by abutting the terminal end of the original to that of the original positioning member.

What is claimed is:

1. In a xerographic reproducing apparatus having a platen forming a part of a housing for supporting a document to be copied and an optical projection system for projecting light images of said document from said platen to a photosensitive member and a movable registration edge for properly aligning said document, the improvement comprising:

means for effecting incremental movement of said registration edge between first and second operative positions relative to said platen; said means for effecting incremental movement of said registration edge comprising a rack operatively coupled to said registration edge and pinion means operatively coupled to an actuatable wheel, said wheel protruding through said housing for manipulation thereof.

2. Apparatus according to claim 1 including clamping means for retaining said registration edge in a stationary position once it has been moved.

* * * * *